United States Patent
Droz et al.

(10) Patent No.: US 12,078,530 B2
(45) Date of Patent: *Sep. 3, 2024

(54) LIGHT DETECTION USING AN APERTURE

(71) Applicant: Waymo LLC, Mountain View, CA (US)

(72) Inventors: Pierre-Yves Droz, Los Altos, CA (US); David Hutchison, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 17/306,281

(22) Filed: May 3, 2021

(65) Prior Publication Data

US 2021/0255033 A1    Aug. 19, 2021

Related U.S. Application Data

(63) Continuation of application No. 16/679,006, filed on Nov. 8, 2019, now Pat. No. 11,041,753, which is a
(Continued)

(51) Int. Cl.
*G01C 3/08* (2006.01)
*G01J 1/04* (2006.01)
(Continued)

(52) U.S. Cl.
CPC ........... *G01J 1/0407* (2013.01); *G01J 1/0411* (2013.01); *G01J 1/0414* (2013.01); *G01J 1/0425* (2013.01);
(Continued)

(58) Field of Classification Search
None
See application file for complete search history.

(56) References Cited

U.S. PATENT DOCUMENTS

| | | | |
|---|---|---|---|
| 3,899,145 A | 8/1975 | Stephenson | |
| 4,201,442 A | 5/1980 | McMahon et al. | |

(Continued)

FOREIGN PATENT DOCUMENTS

| | | | |
|---|---|---|---|
| CN | 1967284 A | 5/2007 | |
| CN | 101299066 A | 11/2008 | |

(Continued)

OTHER PUBLICATIONS

Search Report and Written Opinion for PCT/US2017/064367 dated Mar. 22, 2018.
(Continued)

*Primary Examiner* — Mark Hellner
(74) *Attorney, Agent, or Firm* — McDonnell Boehnen Hulbert & Berghoff LLP

(57) ABSTRACT

The present disclosure relates to limitation of noise on light detectors using an aperture. One example implementation includes a system. The system includes a lens disposed relative to a scene. The lens focuses light from the scene. The system also includes an aperture defined within an opaque material. The system also includes a waveguide having a first side that receives light focused by the lens and transmitted through the aperture. The waveguide guides the received light toward a second side of the waveguide opposite to the first side. The waveguide has a third side extending between the first side and the second side. The system also includes an array of light detectors that intercepts and detects light propagating out of the third side of the waveguide.

20 Claims, 9 Drawing Sheets

Related U.S. Application Data continuation of application No. 15/368,579, filed on Dec. 3, 2016, now Pat. No. 10,502,618.

(51) Int. Cl.
  *G01S 7/481* (2006.01)
  *G01S 17/89* (2020.01)
  *G02B 6/08* (2006.01)
  *G01J 1/44* (2006.01)

(52) U.S. Cl.
  CPC .......... *G01J 1/0437* (2013.01); *G01S 7/4816* (2013.01); *G01S 7/4818* (2013.01); *G01S 17/89* (2013.01); *G02B 6/08* (2013.01); *G01J 2001/4466* (2013.01)

(56) References Cited

U.S. PATENT DOCUMENTS

| | | | |
|---|---|---|---|
| 4,212,516 | A | 7/1980 | Sawamura |
| 4,544,255 | A | 10/1985 | Utagawa |
| 5,056,914 | A | 10/1991 | Kollodge |
| 5,159,412 | A * | 10/1992 | Willenborg ............ G01N 21/55 |
| | | | 250/559.07 |
| 5,243,553 | A | 9/1993 | Flockencier |
| 5,268,985 | A | 12/1993 | Ando et al. |
| 5,299,045 | A | 3/1994 | Sekiguchi |
| 5,391,869 | A | 2/1995 | Ade et al. |
| 5,502,783 | A | 3/1996 | Wu |
| 5,537,432 | A | 7/1996 | Mehuys et al. |
| 5,608,833 | A | 3/1997 | Au et al. |
| 5,764,842 | A | 6/1998 | Aoki et al. |
| 5,847,817 | A | 12/1998 | Zediker et al. |
| 6,267,492 | B1 | 7/2001 | Reid et al. |
| 6,584,052 | B1 | 6/2003 | Phillips et al. |
| 6,744,948 | B1 | 6/2004 | Pi et al. |
| 7,518,815 | B2 | 4/2009 | Rottmayer et al. |
| 7,894,044 | B1 | 2/2011 | Sullivan |
| 7,969,558 | B2 | 6/2011 | Hall |
| 7,995,875 | B2 | 8/2011 | Yasuda et al. |
| 8,057,085 | B2 | 11/2011 | Lee et al. |
| 8,081,299 | B2 | 12/2011 | Kim et al. |
| 8,190,030 | B2 | 5/2012 | Leclair et al. |
| 8,206,020 | B2 | 6/2012 | Nagata et al. |
| 8,675,181 | B2 | 3/2014 | Hall |
| 8,730,456 | B2 | 5/2014 | Goldberg et al. |
| 8,743,464 | B1 | 6/2014 | Amirparviz |
| 8,767,190 | B2 | 7/2014 | Hall |
| 9,256,007 | B2 | 2/2016 | Vasylyev |
| 9,285,464 | B2 | 3/2016 | Pennecot et al. |
| 9,322,992 | B2 | 4/2016 | Woodward et al. |
| 9,360,554 | B2 | 6/2016 | Retterath et al. |
| 9,405,066 | B2 | 8/2016 | Mahgerefteh et al. |
| 9,529,079 | B1 | 12/2016 | Droz et al. |
| 9,575,341 | B2 | 2/2017 | Heck et al. |
| 9,964,632 | B1 | 5/2018 | Droz et al. |
| 9,992,477 | B2 | 6/2018 | Pacala et al. |
| 10,003,168 | B1 | 6/2018 | Villeneuve |
| 10,018,726 | B2 | 7/2018 | Hall et al. |
| 10,094,925 | B1 | 10/2018 | LaChapelle |
| 10,109,183 | B1 | 10/2018 | Franz et al. |
| 10,126,412 | B2 | 11/2018 | Eldada et al. |
| 10,132,928 | B2 | 11/2018 | Eldada et al. |
| 10,267,970 | B2 | 4/2019 | Jones, Jr. et al. |
| 10,502,618 | B2 | 12/2019 | Droz et al. |
| 10,605,984 | B2 | 3/2020 | Droz et al. |
| 11,041,753 | B2 | 6/2021 | Droz et al. |
| 2002/0009262 | A1 | 1/2002 | Kasama et al. |
| 2003/0034491 | A1 | 2/2003 | Lempkowski et al. |
| 2003/0058506 | A1 | 3/2003 | Green et al. |
| 2003/0063884 | A1 | 4/2003 | Smith et al. |
| 2004/0178329 | A1 | 9/2004 | Kare et al. |
| 2004/0184502 | A1 | 9/2004 | Miyachi et al. |
| 2004/0218869 | A1 | 11/2004 | Takahashi |
| 2004/0232430 | A1 * | 11/2004 | Lempkowski ...... H01L 21/8221 |
| | | | 257/E21.12 |
| 2005/0141808 | A1 | 6/2005 | Cheben et al. |
| 2009/0147239 | A1 | 6/2009 | Zhu et al. |
| 2009/0316431 | A1 | 12/2009 | Nagata et al. |
| 2010/0020306 | A1 | 1/2010 | Hall |
| 2010/0302528 | A1 | 12/2010 | Hall |
| 2011/0136063 | A1 | 6/2011 | Nottola et al. |
| 2011/0216304 | A1 | 9/2011 | Hall |
| 2013/0306848 | A1 | 11/2013 | Dell'orto et al. |
| 2013/0321345 | A1 | 12/2013 | Burns |
| 2014/0168631 | A1 | 6/2014 | Haslim et al. |
| 2015/0185313 | A1 | 7/2015 | Zhu |
| 2015/0219834 | A1 | 8/2015 | Nichol et al. |
| 2015/0293224 | A1 | 10/2015 | Eldada et al. |
| 2015/0293532 | A1 | 10/2015 | Gilliland et al. |
| 2016/0047895 | A1 | 2/2016 | Dussan |
| 2016/0139266 | A1 | 5/2016 | Montoya et al. |
| 2016/0154165 | A1 | 6/2016 | Grot et al. |
| 2016/0161600 | A1 | 6/2016 | Eldada et al. |
| 2016/0259038 | A1 | 9/2016 | Retterath et al. |
| 2016/0363669 | A1 * | 12/2016 | Liu .................... G01S 7/4815 |
| 2017/0223249 | A1 | 8/2017 | Tillotson et al. |
| 2017/0269215 | A1 | 9/2017 | Hall et al. |
| 2017/0370676 | A1 | 12/2017 | Volfson et al. |
| 2018/0045886 | A1 | 2/2018 | Demaray |
| 2018/0074382 | A1 | 3/2018 | Lee et al. |
| 2018/0100924 | A1 | 4/2018 | Brinkmeyer |
| 2018/0149815 | A1 | 5/2018 | Heroux et al. |
| 2018/0172806 | A1 | 6/2018 | Marron |
| 2018/0239096 | A1 | 8/2018 | Houbertz et al. |
| 2018/0267151 | A1 | 9/2018 | Hall et al. |
| 2018/0284227 | A1 | 10/2018 | Hall et al. |
| 2018/0284274 | A1 | 10/2018 | LaChapelle |
| 2018/0321360 | A1 | 11/2018 | Hall et al. |
| 2018/0335628 | A1 | 11/2018 | Hung et al. |
| 2018/0341009 | A1 | 11/2018 | Niclass et al. |
| 2019/0011563 | A1 | 1/2019 | Hall et al. |
| 2019/0017938 | A1 | 1/2019 | Holzapfel et al. |
| 2019/0227147 | A1 | 7/2019 | Lin et al. |

FOREIGN PATENT DOCUMENTS

| | | |
|---|---|---|
| CN | 201252545 Y | 6/2009 |
| CN | 103261961 A | 8/2013 |
| CN | 104777486 A | 7/2015 |
| DE | 202014100836 U1 | 5/2015 |
| EP | 2910969 A1 | 8/2015 |
| JP | H05-236206 A | 9/1993 |
| JP | 2002542580 A | 12/2002 |
| JP | 2003-060213 A | 2/2003 |
| JP | 2012-060012 A | 3/2012 |
| JP | 2012-202776 A | 10/2012 |
| JP | 2015-161683 A | 9/2015 |
| JP | 2015-525444 A | 9/2015 |
| KR | 2010-0006328 A | 1/2010 |
| KR | 10-2015-0133559 A | 11/2015 |
| WO | 01/65469 A1 | 9/2001 |
| WO | 03098263 A2 | 11/2003 |
| WO | 2006064500 A2 | 6/2006 |
| WO | 2007046100 A2 | 4/2007 |
| WO | 2008078543 A1 | 7/2008 |
| WO | 2016116733 A1 | 7/2016 |
| WO | 2016153687 A1 | 9/2016 |
| WO | 2017112416 A1 | 6/2017 |

OTHER PUBLICATIONS

Jurgen Van Erps, Lawrence Bogaert, Bart Volckaerts, Christof Debaes, Hugo Thienpont, "Prototyping micro-optical components with integrated out-of-plane coupling structures using deep lithography with protons," Proc. SPIE 6185, Micro-Optics, VCSELs, and Photonic Interconnects II: Fabrication, Packaging, and Integration, 618504 (Apr. 21, 2006).

* cited by examiner

LIGHT DETECTION USING AN APERTURE

CROSS-REFERENCE TO RELATED APPLICATIONS

This application is a continuation of U.S. patent application Ser. No. 16/679,006, filed Nov. 8, 2019, which is a continuation of U.S. patent application Ser. No. 15/368,579, filed Dec. 3, 2016. The foregoing applications are incorporated herein by reference.

BACKGROUND

Unless otherwise indicated herein, the materials described in this section are not prior art to the claims in this application and are not admitted to be prior art by inclusion in this section.

Light detectors, such as photodiodes, single photon avalanche diodes (SPADs), or other types of avalanche photodiodes (APDs), can be used to detect light that is imparted on their surfaces (e.g., by outputting an electrical signal, such as a voltage or a current, corresponding to an intensity of the light). Many types of such devices are fabricated out of semiconducting materials, such as silicon. In order to detect light over a substantial geometric area, multiple light detectors can be arranged into arrays connected in parallel. These arrays are sometimes referred to as silicon photomultipliers (SiPMs) or multi-pixel photon counters (MPPCs).

Some of the above arrangements are sensitive to relatively low intensities of light, thereby enhancing their detection qualities. However, this can lead to the above arrangements also being disproportionately susceptible to adverse background effects (e.g., extraneous light from outside sources could affect a measurement by the light detectors).

SUMMARY

In one example, a system includes a lens disposed relative to a scene and configured to focus light from the scene. The system also includes an aperture defined within an opaque material. The system also includes a waveguide having a first side that receives light focused by the lens and transmitted through the aperture. The waveguide guides the received light toward a second side of the waveguide opposite to the first side. The waveguide has a third side extending between the first side and the second side. The system also includes an array of light detectors that intercepts and detects light propagating out of the third side of the waveguide.

In another example, a method involves focusing, via a lens disposed relative to a scene, light from the scene. The method also involves transmitting the focused light through an aperture defined within an opaque material. The method also involves receiving, at a first side of a waveguide, light transmitted through the aperture. The method also involves guiding, by the waveguide, the received light toward a second side of the waveguide. The method also involves detecting, at an array of light detectors, light propagating out of a third side of the waveguide. The third side extends between the first side and the second side.

In yet another example, a light detection and ranging (LIDAR) device includes a LIDAR transmitter that illuminates a scene. The LIDAR device also includes a LIDAR receiver that receives light scattered by one or more objects within the scene. The LIDAR receiver includes a lens that focuses the scattered light. The LIDAR receiver also includes an aperture defined within an opaque material. The LIDAR receiver also includes a waveguide having a first side that receives light focused by the lens and transmitted through the aperture. The waveguide guides the received light toward a second side of the waveguide opposite to the first side. The waveguide has a third side extending between the first side and the second side. The LIDAR receiver also includes an array of light detectors that intercepts and detects light propagating out of the third side of the waveguide.

In still another example, a system comprises means for focusing, via a lens disposed relative to a scene, light from the scene. The system also comprises means for transmitting the focused light through an aperture defined within an opaque material. The system also comprises means for receiving, at a first side of a waveguide, light transmitted through the aperture. The system also comprises means for guiding, by the waveguide, the received light toward a second side of the waveguide. The system also comprises means for detecting, at an array of light detectors, light propagating out of a third side of the waveguide. The third side extends between the first side and the second side.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
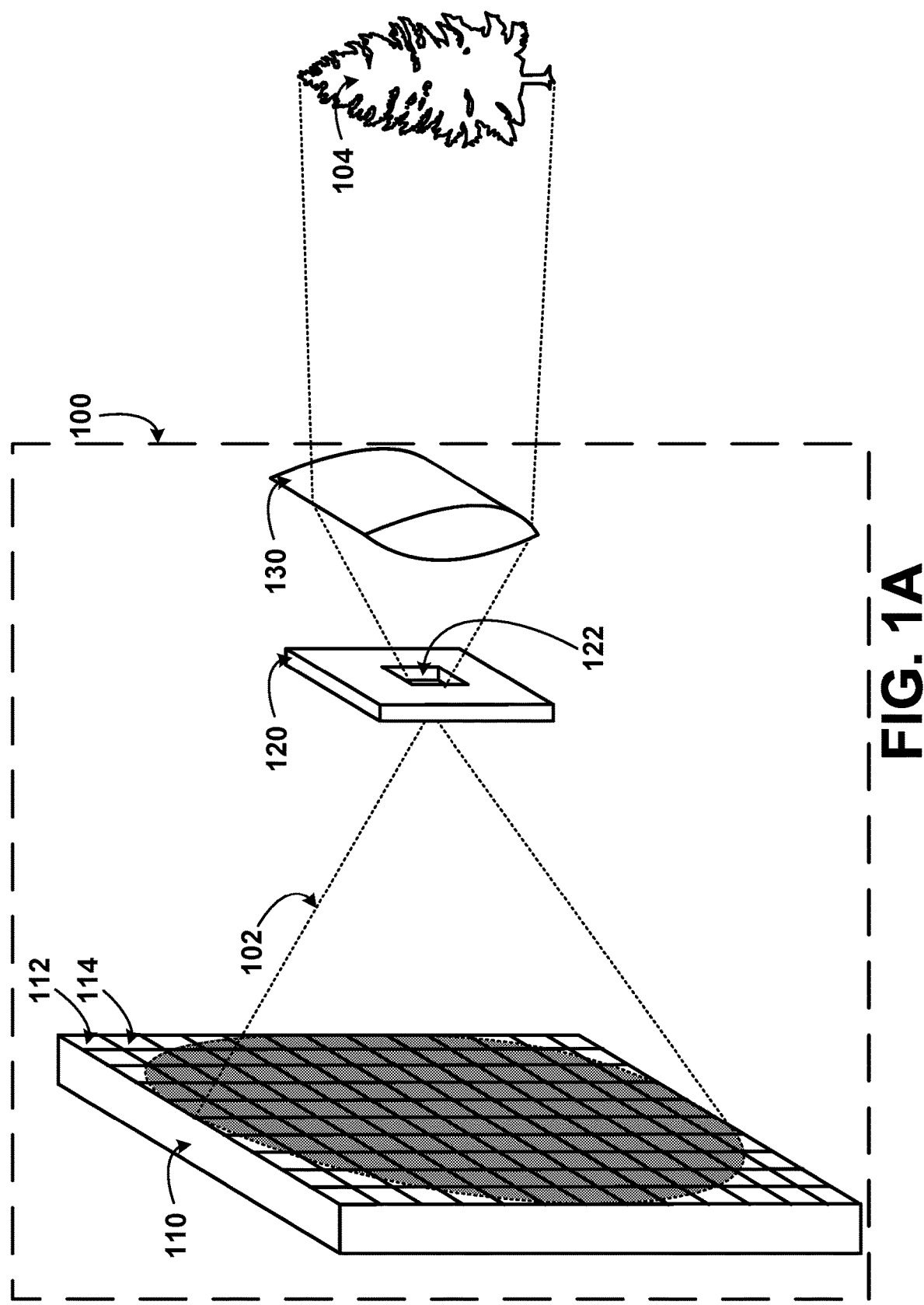
FIG. 1A is an illustration of a noise limiting system that includes an aperture, according to example embodiments.

Any example embodiment or feature described herein is not necessarily to be construed as preferred or advantageous over other embodiments or features. The example embodiments described herein are not meant to be limiting. It will be readily understood that certain aspects of the disclosed implementations can be arranged and combined in a wide variety of different configurations. Furthermore, the particular arrangements shown in the figures should not be viewed as limiting. It should be understood that other implementations might include more or less of each element shown in a given figure. In addition, some of the illustrated elements may be combined or omitted. Similarly, an example implementation may include elements that are not illustrated in the figures.

I. Overview

Example implementations may relate to devices, systems, and methods for reducing background light imparted onto an array of light detectors. The light detectors in the array may be sensing light from a scene. For example, the light detectors may be a sensing component of a light detection and ranging (LIDAR) device.

One example system includes a lens. The lens may be used to focus light from a scene. However, the lens may also focus background light not intended to be observed by the system (e.g., sunlight within the scene). In order to selectively filter the light (i.e., separate background light from light corresponding to information within the scene), an opaque material (e.g., selectively etched metal, a glass substrate partially covered by a mask, etc.) may be placed behind the lens. The opaque material could be shaped as a slab, a sheet, or various other shapes in a variety of embodiments. Within the opaque material, an aperture may be defined. The aperture may select a region of, or the entirety of, the light of the scene focused by the lens for transmission through the aperture.

On a backside of the opaque material (e.g., a side of the opaque material opposite another side on which focused light from the lens is projected, etc.), the light selected by the aperture may be transmitted through the aperture. In the direction of propagation of the light transmitted through the aperture, the system may include a waveguide having a first side (e.g., adjacent to the aperture, etc.) and a second side opposite to the first side. The system may also include an array of light detectors (e.g., SPADs) disposed on or otherwise adjacent to a third side of the waveguide. For example, the third side may extend from the first side to the second side along a guiding direction in which the waveguide guides propagation of light therein toward the second side. Thus, the array of light detectors may detect light that propagates through the third side of the waveguide (e.g., evanescent light, and/or light leaking through a cladding layer of the waveguide).

Because the light from the aperture is guided along a length of the waveguide, the number of light detectors able to fit into a detection area (e.g., the third side) can be larger than could fit in a cross-sectional area of the aperture. This may be due to the light being more tightly focused, and thus have a smaller cross-sectional area, at the aperture than along the third side of the waveguide. In some examples, the system may also include a mirror (e.g., light reflector) disposed along the second side to reflect guided light arriving at the second side back into the waveguide. As a result, for instance, a larger amount of the light guided inside the waveguide may propagate out of the third side and toward the array of light detectors.

In one example implementation, the system can employ frustrated total internal reflection (FTIR) to transmit a portion of the guided light in the waveguide to the array of light detectors. For example, the waveguide can be formed as a glass plate (or other material transparent to wavelength(s) of the guided light). The glass plate (i.e., waveguide) may also include a relatively low index of refraction (e.g., a polymer coating, fluorine-doped glass, etc.) cladding layer disposed on the third side of the waveguide to facilitate FTIR of the guided light. The cladding layer may include gaps (e.g., dents, etc.) to increase the amount of light escaping through the cladding layer at the positions of the gaps. Each gap can be aligned with a corresponding light detector in the array such that light escaping from the gap can be detected by the corresponding light detector. Thus, in this example, the waveguide may be configured as a leaky waveguide in which light leaks out of the third side at positions corresponding to the light detectors. Further, in some instances, separation distances between the gaps in the cladding layer can be gradually reduced as the light propagates toward the second side. As a result, a more uniform light intensity of the leaked light can be achieved.

In another example implementation, the system can employ scattered coupling to transmit light through the third side toward the light detectors in the array. For example, the waveguide can be implemented as a grating coupler that varies the strength of scattered light evanescing through the third side in a predetermined manner. Further, in some instances, the system may also include a mirror disposed along a fourth side of the waveguide (opposite to the third side). By doing so, the waveguide can be further configured as a wavelength filter by tuning the separation distances along the grating structures on the third side.

Other example implementations are possible as well and are described in greater detail within example embodiments herein.

II. Example Systems and Devices

FIG. 1A is an illustration of a noise limiting system 100 that includes an aperture, according to example embodiments. As shown, system 100 includes an array 110 of light detectors (exemplified by detectors 112 and 114), an aperture 122 defined within an opaque material 120, and a lens 130. System 100 may measure light 102 scattered by an object 104 within a scene. Light 102 may also come, at least partially, from background sources. Thus, in some examples, system 100 may be included in a light detection and ranging (LIDAR) device. For example, the LIDAR device may be used for navigation of an autonomous vehicle. Further, in some embodiments, system 100, or portions thereof, may be contained within an area that is unexposed to exterior light other than through lens 130 and/or aperture 122. This may prevent ambient light from triggering the detectors in array 110 thereby affecting measurements.

Array 110 includes an arrangement of light detectors, exemplified by detectors 112 and 114. In various embodiments, array 110 may have different shapes. As shown, array 110 has a rectangular shape. However, in other embodiments, array 110 may be circular or may have a different shape. The size of array 110 may be selected according to an expected cross-sectional area of light 110 diverging from aperture 122, and may thus be based on the distance between array 110 and aperture 122, dimensions of aperture 122, optical characteristics of lens 130, etc. In some embodiments, array 110 may be movable. For example, array 110 may be actuated closer to, or further from, aperture 122. To that end, for instance, array 110 could be mounted on an electrical stage capable of translating in one, two, or three dimensions.

Further, in some implementations, array 110 may provide one or more outputs to a computing device or logic circuitry. For example, a microprocessor-equipped computing device may receive electrical signals from array 110 which indicate an intensity of light 102 incident on array 110. The computing device may then use the electrical signals to determine information about object 104 (e.g., distance of object 104 from aperture 122, etc.). In some embodiments, some or all of the light detectors within array 110 may be interconnected with one another in parallel. To that end, for example, array 110 may be an SiPM or an MPPC, depending on the particular arrangement and type of the light detectors within array 110. By connecting the the light detectors in a parallel circuit configuration, for instance, the outputs from the light detectors can be combined to effectively increase a detection area in which a photon in light 102 can be detected (e.g., shaded region of array 110 shown in FIG. 1A).

Light detectors 112, 114, etc., may include various types of light detectors. In one example, detectors 112, 114, etc. include SPADs. SPADs may employ avalanche breakdown within a reverse biased p-n junction (i.e., diode) to increase an output current for a given incident illumination on the SPAD. Further, SPADs may be able to generate multiple electron-hole pairs for a single incident photon. In another example, light detectors 112, 114, etc., may include APDs. In some instances, APDs or SPADs may be biased above an avalanche breakdown voltage. Such a biasing condition may create a positive feedback loop having a loop gain that is greater than one. Further, APDs or SPADs biased above the threshold avalanche breakdown voltage may be single photon sensitive. In other examples, light detectors 112, 114, etc., may include photoresistors, charge-coupled devices (CCDs), and/or photovoltaic cells, among others.

In some implementations, array 110 may include more than one type of light detector across the array. For example, array 110 can be configured to detect multiple predefined wavelengths of light 102. To that end, for instance, array 110 may comprise some SPADs that are sensitive to one range of wavelengths and other SPADs that are sensitive to a different range of wavelengths. In some embodiments, light detectors 110 may be sensitive to wavelengths between 400 nm and 1.6 μm (visible and infrared wavelengths). Further, light detectors 110 may have various sizes and shapes within a given embodiment or across various embodiments. In some embodiments, light detectors 112, 114, etc., may include SPADs that have package sizes that are 1%, 0.1%, or 0.01% of the area of array 110.

Opaque material 120 may block a portion of light 102 from the scene (e.g., background light) that is focused by the lens 130 from being transmitted to array 110. As such, opaque material 120 may be configured to block certain background light that could adversely affect the accuracy of a measurement performed by array 110. Opaque material 120, and therefore the aperture 122, may be positioned at or near a focal plane of the lens 130. In one example, opaque material 120 may block transmission by absorbing light 102. In another example, opaque material 120 may block transmission by reflecting light 102. A non-exhaustive list of example implementations of opaque material 120 includes an etched metal, a polymer substrate, a biaxially-oriented polyethylene terephthalate (BoPET) sheet (also referred to as a Mylar® sheet), or a glass overlaid with an opaque mask, among other possibilities.

Aperture 122 provides a port within opaque material 120 through which light 102 may be transmitted. Aperture 122 may be defined within opaque material 120 in a variety of ways. In one example, where opaque material 120 includes a metal, the metal may be etched to define aperture 122. In another example, where opaque material 120 is a glass substrate overlaid with a mask, the mask may include a gap that defines aperture 122 (e.g., via photolithography). In various embodiments, aperture 122 may be partially or wholly transparent. For example, where opaque material 120 is a glass substrate overlaid with a mask, aperture 122 may be defined as a portion of the glass substrate not covered by the mask, such that aperture 122 is not completely hollow but rather made of glass. Thus, for instance, aperture 122 may be nearly, but not entirely, transparent to one or more wavelengths of light 102 scattered by the object 104 (because most glass substrates are not 100% transparent).

Aperture 122 (in conjunction with opaque material 120) may be configured to spatially filter light 102 from the scene at the focal plane. For example, light 102 may be focused onto a focal plane along a surface opaque material 120, and aperture 122 may allow only a portion of the focused light to be transmitted to array 110. As such, aperture 122 may behave as an optical pinhole. In one embodiment, aperture 122 may have a cross-sectional area of between 0.02 mm$^2$ and 0.06 mm$^2$ (e.g., 0.04 mm$^2$). In other embodiments, aperture 122 may have a different cross-sectional area depending on various factors such as optical characteristics of lens 130, distance to array 110, noise rejection characteristics of the light detectors in array 110, etc.

Although the term "aperture" as used above with respect to aperture 122 describes a recess or hole in an opaque material through which light may be transmitted, it is noted that the term "aperture" may include a broad array of optical features. In one example, as used throughout the description and claims, the term "aperture" may additionally encompass transparent or translucent structures defined within an opaque material through which light can be partially transmitted. In another example, the term "aperture" may describe a structure that otherwise selectively limits the passage of light (e.g., through reflection or refraction), such as a mirror surrounded by an opaque material. In one example embodiment, mirror arrays surrounded by an opaque material may be arranged to reflect light in a certain direction, thereby defining a reflective portion. This reflective portion may be referred to as an "aperture".

Although aperture 122 is shown to have a rectangular shape, it is noted that aperture 122 can have a different shape, such as a round shape, circular shape, elliptical shape, among others. In some examples, aperture 122 can alternatively have an irregular shape specifically designed to account for optical aberrations within system 100. For example, a keyhole shaped aperture may assist in accounting for parallax occurring between an emitter (e.g., light source that emits light 102) and a receiver (e.g., lens 130 and array 110). The parallax may occur if the emitter and the receiver are not located at the same position, for example. Other irregular aperture shapes are also possible, such as specifically shaped apertures that correspond with particular objects expected to be within a particular scene or irregular apertures that select specific polarizations of light 102 (e.g., horizontal polarizations or vertical polarizations).

Lens 130 may focus light 102 from the scene onto the focal plane where aperture 122 is positioned. With this arrangement, the light intensity collected from the scene, at lens 130, may be focused to have a reduced cross-sectional area over which light 102 is projected (i.e., increasing the spatial power density of light 102). For example, lens 130 may include a converging lens, a biconvex lens, and/or a spherical lens, among other examples. Alternatively, lens 130 can be implemented as a consecutive set of lens positioned one after another (e.g., a biconvex lens that focuses light in a first direction and an additional biconvex lens that focuses light in a second direction). Other types of lenses and/or lens arrangements are also possible. In addition, system 100 may include other optical elements (e.g., mirrors, etc.) positioned near lens 130 to aid in focusing light 102 incident on lens 130 onto opaque material 120.

Object 104 may be any object positioned within a scene surrounding system 100. In implementations where system 100 is included in a LIDAR device, object 104 may be illuminated by a LIDAR transmitter that emits light 102 (or a portion thereof). In example embodiments where the LIDAR device is used for navigation on an autonomous vehicle, object 104 may comprise pedestrians, other vehicles, obstacles (e.g., trees), or road signs, among others.

As noted above, light 102 may be scattered by object 104, focused by lens 130, transmitted through aperture 122 in opaque material 120, and measured by light detectors in array 110. This sequence may occur (e.g., in a LIDAR device) to determine information about object 104. In some embodiments, light 102 measured by array 110 may additionally or alternatively include light scattered off multiple objects, transmitted by a transmitter of another LIDAR device, ambient light, sunlight, among other possibilities.

In addition, the wavelength(s) of light 102 used to analyze object 104 may be selected based on the types of objects expected to be within a scene and their expected distance from lens 130. For example, if an object expected to be within the scene absorbs all incoming light of 500 nm wavelength, a wavelength other than 500 nm may be selected to illuminate object 104 and to be analyzed by system 100. The wavelength of light 102 (e.g., if transmitted by a transmitter of a LIDAR device) may be associated with a source that generates light 102. For example, if the light is generated by a diode laser, light 102 may comprise light within a wavelength range centered on 900 nm (or other wavelength of the diode laser). Thus, various types of light sources are possible for generating light 102 (e.g., an optical fiber amplifier, various types of lasers, a broadband source with a filter, etc.).

Figure 1B:
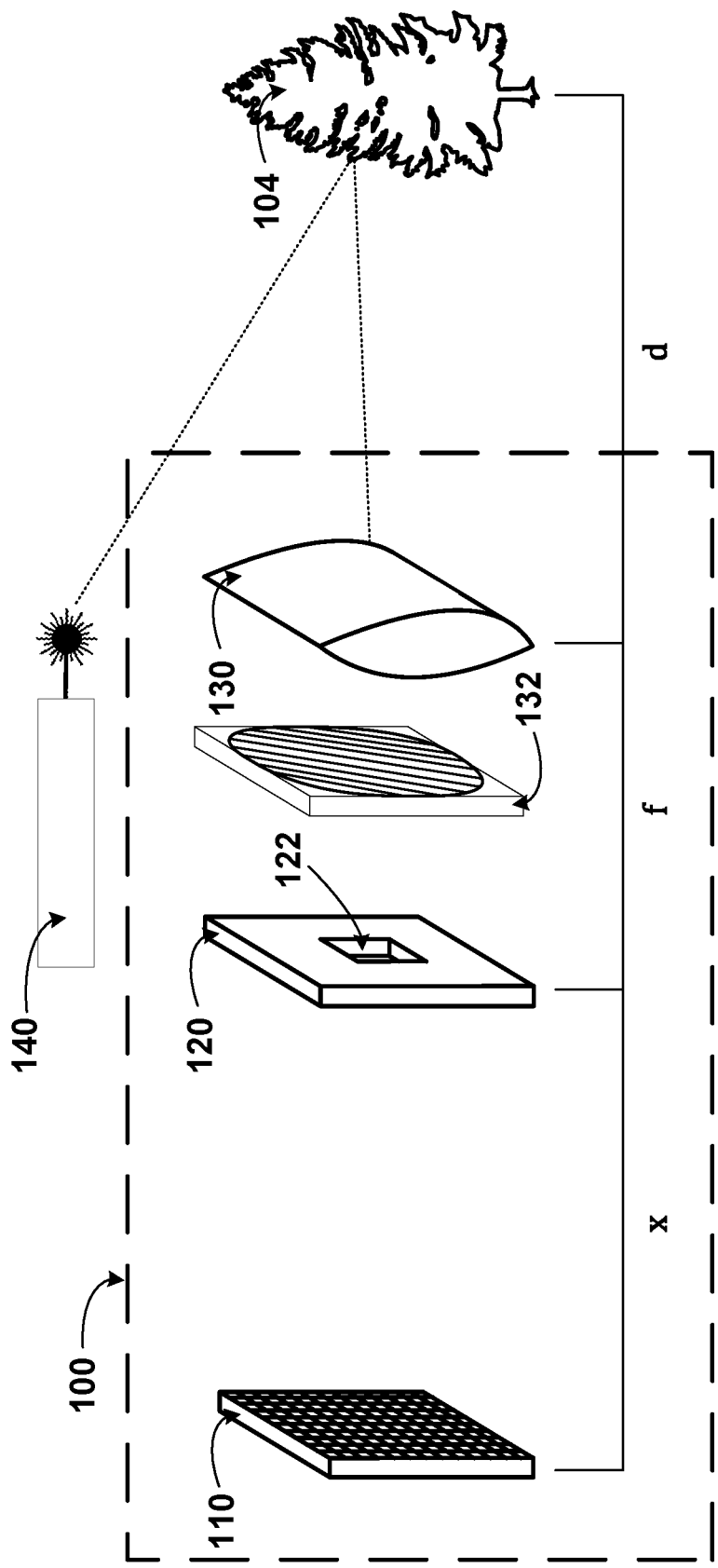
FIG. 1B is another illustration of the system of FIG. 1A.

FIG. 1B is another illustration of system 100. As shown, system 100 may also include a filter 132. Filter 132 may include any optical filter configured to selectively transmit light within a predefined wavelength range. For example, filter 132 can be configured to selectively transmit light within a visible wavelength range, an infrared wavelength range, or any other wavelength range of the light signal emitted by emitter 140. For example, optical filter 132 may be configured to divert light of particular wavelengths away from the array 110. For instance, optical filter 132 may divert a portion of light 102 that is not of the wavelength range emitted by emitter 140 away from array 110. Therefore, optical filter 132 may, at least partially, reduce ambient light or background light from adversely affecting measurements by array 110.

In various embodiments, optical filter 132 may be located in various positions relative to array 110. As shown, optical filter 132 is located between lens 130 and opaque material 120. However, optical filter 132 may alternatively be located between lens 130 and object 104, between material 120 and array 110, combined with array 110 (e.g., array 110 may have a surface screen that optical filter 132, or each of the light detectors in array 110 may individually be covered by a separate optical filter, etc.), combined with aperture 122 (e.g., aperture 122 may be transparent only to a particular wavelength range, etc.), or combined with lens 130 (e.g., surface screen disposed on lens 130, material of lens 130 transparent only to a particular wavelength range, etc.).

Further, as shown in FIG. 1B, system 100 could be used with an emitter 140 that emits a light signal to be measured by array 110. Emitter 140 may include a fiber laser, a photodiode, a filament, a LIDAR transmitter, or any other light source. As shown, emitter 140 may emit light which is scattered by object 104 in the scene and ultimately measured (at least a portion thereof) by array 110. In some embodiments, emitter 140 may be a laser emitter comprising an optical fiber amplifier or other amplifying system that increases power output of laser emitter 140. Additionally or alternatively, in some embodiments, emitter 140 may be implemented as a pulsed laser (as opposed to a continuous wave laser), allowing for increased peak power while maintaining an equivalent continuous power output.

The following is a mathematical illustration comparing the amount of background light that is received by lens 130 to the amount of signal light that is detected by the array 110. As shown, the distance between object 104 and lens 130 is 'd', the distance between lens 130 and opaque material 120 is 'f', and the distance between the opaque material 120 and the array 110 is 'x'. As noted above, material 120 and aperture 122 may be positioned at the focal plane of lens 130 (i.e., 'f' may be equivalent to the focal length). Further, as shown, emitter 140 is located at a distance 'd' from object 104.

For the sake of example, it is assumed that object 104 is fully illuminated by sunlight at normal incidence, where the sunlight represents a background light source. Further, it is assumed that all the light that illuminates object 104 is scattered according to Lambert's cosine law. In addition, it is assumed that all of the light (both background and signal) that reaches array 110 is fully detected by array 110.

The power of the signal, emitted by emitter 140, that reaches aperture 122, and thus array 110, can be calculated using the following:

$$P_{signal} = P_{tx} \times \Gamma \times \frac{A_{lens}}{\pi d^2}$$

where $P_{signal}$ represents the radiant flux (e.g., in W) of the optical signal emitted by emitter 140 that reaches array 110, $P_{tx}$ represents the power (e.g., in W) transmitted by emitter 140, $\Gamma$ represents the reflectivity of object 104 (e.g., taking into account Lambert's Cosine Law), and $A_{lens}$ represents the cross-sectional area of lens 130.

The background light that reaches lens 130 can be calculated as follows:

$$\overline{P}_{background} = \frac{\overline{P}_{sun} \times T_{filter}}{\pi}$$

where $\overline{P}_{background}$ represents the radiance (e.g., in $$\frac{W}{m^2 \cdot sr}$$

of the background light (caused by sunlight scattering off object 104) arriving on lens 130 that is within a wavelength band that will be selectively passed by filter 132, $\overline{P}_{sun}$ represents the irradiance (e.g., in $$\frac{W}{m^2}$$

density due to the sun (i.e., the background source), and $T_{filter}$ represents the transmission coefficient of filter 132

(e.g., a bandpass optical filter). The factor of =relates to the assumption of Lambertian scattering off of object 104 from normal incidence.

Aperture 122 reduces the amount of background light permitted to be transmitted to the array 110. To calculate the power of the background light that reaches array 110, after being transmitted through aperture 122, the area of aperture 122 is taken into account. The cross-sectional area ($A_{aperture}$) of aperture 122 can be calculated as follows:

$$A_{aperture} = w \times h$$

where $A_{aperture}$ represents the surface area of aperture 122 relative to object 104, and w and h represent the width and height (or length) of aperture 122, respectively. In addition, if lens 130 is a circular lens, the cross-sectional area ($A_{lens}$) of lens 130 can be calculated as follows:

$$A_{lens} = \pi \left(\frac{d_{lens}}{2}\right)^2$$

where $d_{lens}$ represents the diameter of the lens.

Thus, the background power transmitted to array 110 through aperture 122 can be calculated as follows:

$$P_{background} = \overline{P}_{background} \times \frac{A_{aperture}}{f^2} \times A_{lens}$$

where $P_{background}$ represents background power incident on array 110, and $$\frac{A_{aperture}}{f^2}$$

represents the acceptance solid angle in steradians. The above formula indicates that $P_{background}$ is the amount of radiance in the background signal after being reduced by lens 130 and aperture 122.

Substituting the above determined values in for $\overline{P}_{background}$, $A_{aperture}$, and $A_{lens}$ the following can be derived:

$$P_{background} = \left(\frac{\overline{P}_{sun}T_{filter}}{\pi}\right) \times \left(\frac{wh}{f^2}\right) \times \left(\pi\left(\frac{d_{lens}}{2}\right)^2\right) = \overline{P}_{sun}T_{filter}wh\frac{d_{lens}^2}{4f^2}$$

Additionally, the quantity $$F = \frac{f}{d_{lens}}$$

may be referred to as the "F number" of lens 130. Thus, with one more substitution, the following can be deduced as the background power:

$$P_{background} = \frac{\overline{P}_{sun}T_{filter}wh}{4F^2}$$

Making similar substitutions, the following can be deduced for signal power transmitted from the emitter 140 that arrives at the array 110:

$$P_{signal} = P_{tx} \times \Gamma \times \frac{\pi\left(\frac{d_{lens}}{2}\right)^2}{\pi d^2} = \frac{P_{tx}\Gamma d_{lens}^2}{4d^2}$$

Further, a signal to noise ratio (SNR) of system 100 may be determined by comparing $P_{signal}$ with $P_{background}$. As demonstrated, the background power ($P_{background}$) may be significantly reduced with respect to the signal power due to the inclusion of aperture 122, particularly for apertures having small w and/or small h (numerator of $P_{background}$ formula above). Besides reducing aperture area, increasing the transmitted power ($P_{tx}$) by emitter 140, decreasing the transmission coefficient ($T_{filter}$) (i.e., reducing an amount of background light that gets transmitted through the filter), and increasing the reflectivity (T) of object 104 may be ways of increasing the SNR. Further, it is noted that in implementations where emitter 140 emits a pulsed signal, the shot noise of the background, as opposed to the power of the background, may be primarily relevant when computing the SNR. Thus, in some implementations, the SNR can be alternatively computed by comparing the shot noise against the signal power.

As shown in FIG. 1A, light 102 diverges as it propagates away from aperture 122. Due to the divergence, a detection area at array 110 (e.g., shown as shaded area illuminated by light 102) may be larger than a cross-sectional area of aperture 122 at the focal plane. An increased detection area (e.g., measured in m$^2$) for a given light power (e.g., measured in W) may lead to a reduced light intensity (e.g., measured in $$\frac{W}{m^2}$$

incident on array 110.

The reduction in light intensity may be particularly beneficial in embodiments where array 110 includes SPADs or other light detectors having high sensitivities. For example, SPADs derive their sensitivity from a large reverse-bias voltage that produces avalanche breakdown within a semiconductor. This avalanche breakdown can be triggered by the absorption of a single photon, for example. Once a SPAD absorbs a single photon and the avalanche breakdown begins, the SPAD cannot detect additional photons until the SPAD is quenched (e.g., by restoring the reverse-bias voltage). The time until the SPAD is quenched may be referred to as the recovery time. If additional photons are arriving at time intervals approaching the recovery time (e.g., within a factor of ten), the SPAD may begin to saturate, and the measurements by the SPAD may thus become less reliable. By reducing the light power incident on any individual light detector (e.g., SPAD) within array 110, the light detectors (e.g., SPADs) in array 110 may remain unsaturated. As a result, the light measurements by each individual SPAD may have an increased accuracy.

Figure 2:
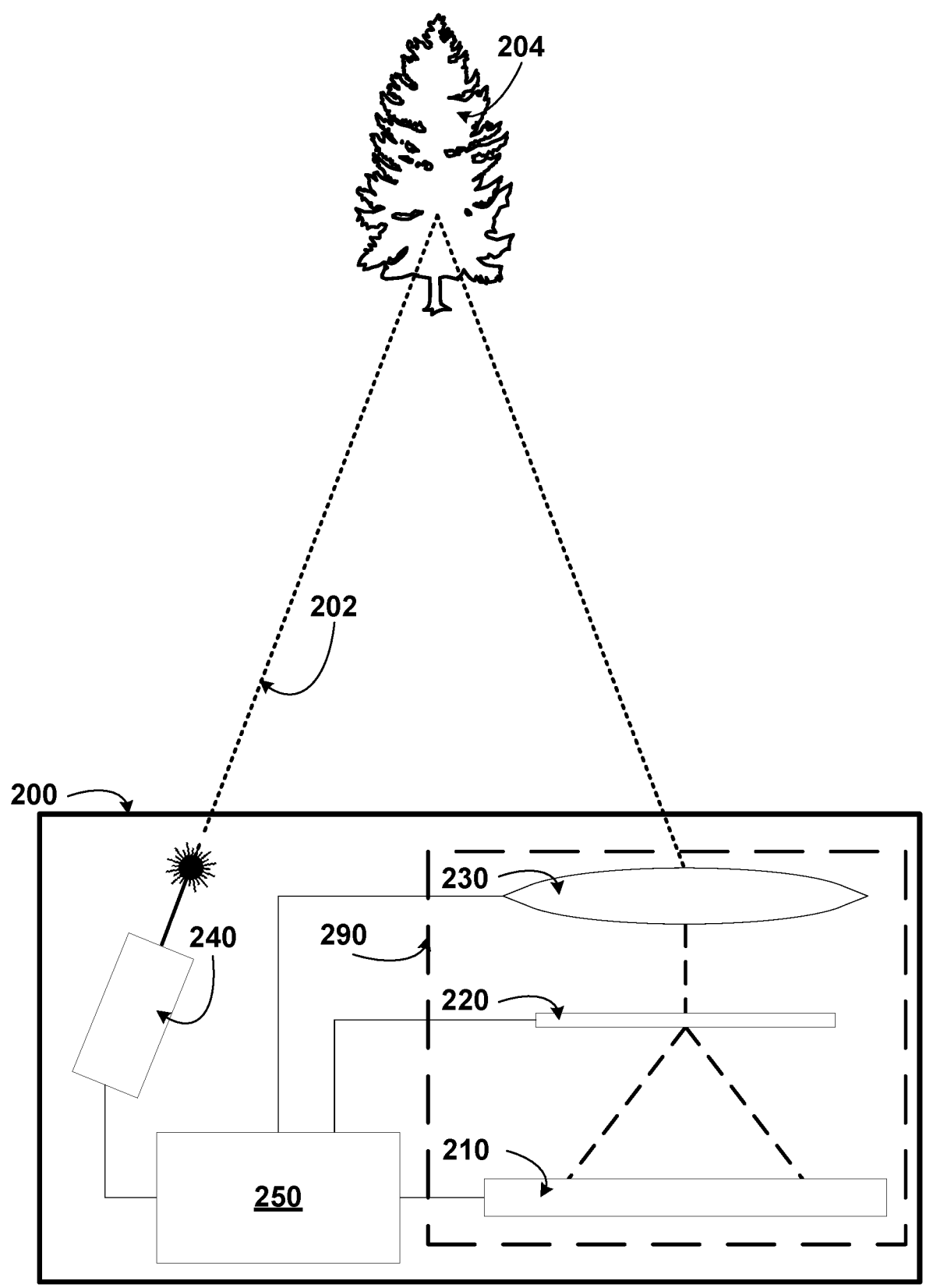
FIG. 2 is a simplified block diagram of a LIDAR device, according to example embodiments.

FIG. 2 is a simplified block diagram of a LIDAR device 200, according to example embodiments. In some example embodiments, LIDAR device 200 can be mounted to a vehicle and employed to map a surrounding environment (e.g., the scene including object 204, etc.) of the vehicle. As shown, LIDAR device 200 includes a laser emitter 240 that may be similar to emitter 140. Further, as shown, LIDAR device 200 includes a controller 250. Further, as shown, LIDAR device 200 includes a noise limiting system 290 that may be similar to system 100. For example, as shown, system 290 includes an array 210 of light detectors, an opaque material 220 with an aperture defined therein (not shown), and a lens 230, which are similar, respectively, to array 110, opaque material 120, and lens 130. It is noted that LIDAR device 200 may alternatively include more or fewer components than those shown. For example, LIDAR device 200 may include an optical filter (e.g., filter 132). Thus, system 290 can be implemented similarly to system 100 and/or any other noise limiting system described herein. Device 200 may operate emitter 240 to emit light 202 toward a scene that includes object 204. Device 200 may then detect scattered light 202 to map or otherwise determine information about object 204.

Controller 250 may be configured to control components of LIDAR device 200 and to analyze signals received from components of LIDAR device 200 (e.g., array 210 of light detectors). To that end, controller 250 may include one or more processors (e.g., a microprocessor, etc.) that execute instructions stored in a memory (not shown) of device 200 to operate device 200. Additionally or alternatively, controller 250 may include digital or analog circuitry wired to perform one or more of the various functions described herein.

In some implementations, controller 250 may use timing information associated with a signal measured by array 210 to determine a location (e.g., distance from LIDAR device 200) of object 204. For example, in embodiments where laser emitter 240 is a pulsed laser, controller 250 can monitor timings of output light pulses and compare those timings with timings of signal pulses measured by array 210. For instance, controller 250 can estimate a distance between device 200 and object 204 based on the speed of light and the time of travel of the light pulse (which can be calculated by comparing the timings). In some implementations, controller 250 may be configured to account for parallax (e.g., due to laser emitter 240 and lens 230 not being located at the same location in space). By accounting for the parallax, controller 250 can improve accuracy of the comparison between the timing of the output light pulses and the timing of the signal pulses measured by the array 210.

In some implementations, controller 250 could modulate light 202 emitted by emitter 240. For example, controller 250 could change the projection (e.g., pointing) direction of emitter 240 (e.g., by actuating a mechanical stage that mounts emitter 240). As another example, controller 250 could modulate the timing, the power, or the wavelength of light 202 emitted by emitter 240. In some implementations, controller 250 may also control other operational aspects of device 200, such as adding or removing filters (e.g., filter 132) along a path of propagation of light 202, adjusting relative positions of various components of device 200 (e.g., array 210, opaque material 220 (and an aperture therein), lens 230, etc.), among other possibilities.

In some implementations, controller 250 could also adjust an aperture (not shown) within material 220. For example, the aperture may, in some embodiments, be selectable from a number of apertures defined within the opaque material. In such embodiments, a MEMS mirror located between the lens and the opaque material may be adjustable by the computing device to determine to which of the multiple apertures the light is directed. In some embodiments, the various apertures may have different shapes and sizes. In still other embodiments, the aperture may be defined by an iris (or other type of diaphragm). The iris may be expanded or contracted by controller 250, for example, to control the size or shape of the aperture.

Thus, in some examples, LIDAR device 200 can modify a configuration of system 290 to obtain additional or different information about object 204 and/or the scene. In one example, controller 250 may select a larger aperture in response to a determination that background noise received by system from the scene is currently relatively low (e.g., during night-time). The larger aperture, for instance, may allow system 290 to detect a portion of light 202 that would otherwise be focused by lens 130 outside the aperture. In another example, controller 250 may select a different aperture position to intercept the portion of light 202. In yet another example, controller 250 could adjust the distance (e.g., distance 'x' shown in FIG. 1B) between the aperture and light detector array 210. By doing so, for instance, the cross-sectional area of a detection region in array 210 (i.e., cross-sectional area of light 202 at array 210) can be adjusted as well (e.g., shaded region shown in FIG. 1A).

However, in some scenarios, the extent to which the configuration of system 290 can be modified may depend on various factors such as a size of LIDAR device 200 or system 290, among other factors. For example, referring back to FIG. 1A, a size of array 110 may depend on an extent of divergence of light 102 from a location of aperture 122 to a location of array 110 (e.g., distance 'x' shown in FIG. 1B). Thus, for instance, the maximum vertical and horizontal extents of array 110 may depend on the physical space available for accommodating system 100 within a LIDAR device. Similarly, for instance, an available range of values for distance 'x' (shown in FIG. 1B) between array 110 and aperture 122 may also be limited by physical limitations of a LIDAR device where system 100 is employed.

Accordingly, example implementations are described herein for increasing a detection area in which light detectors can intercept light from the scene, while also reducing background noise and efficiently using space available for accommodating system 290.

Figure 3A:
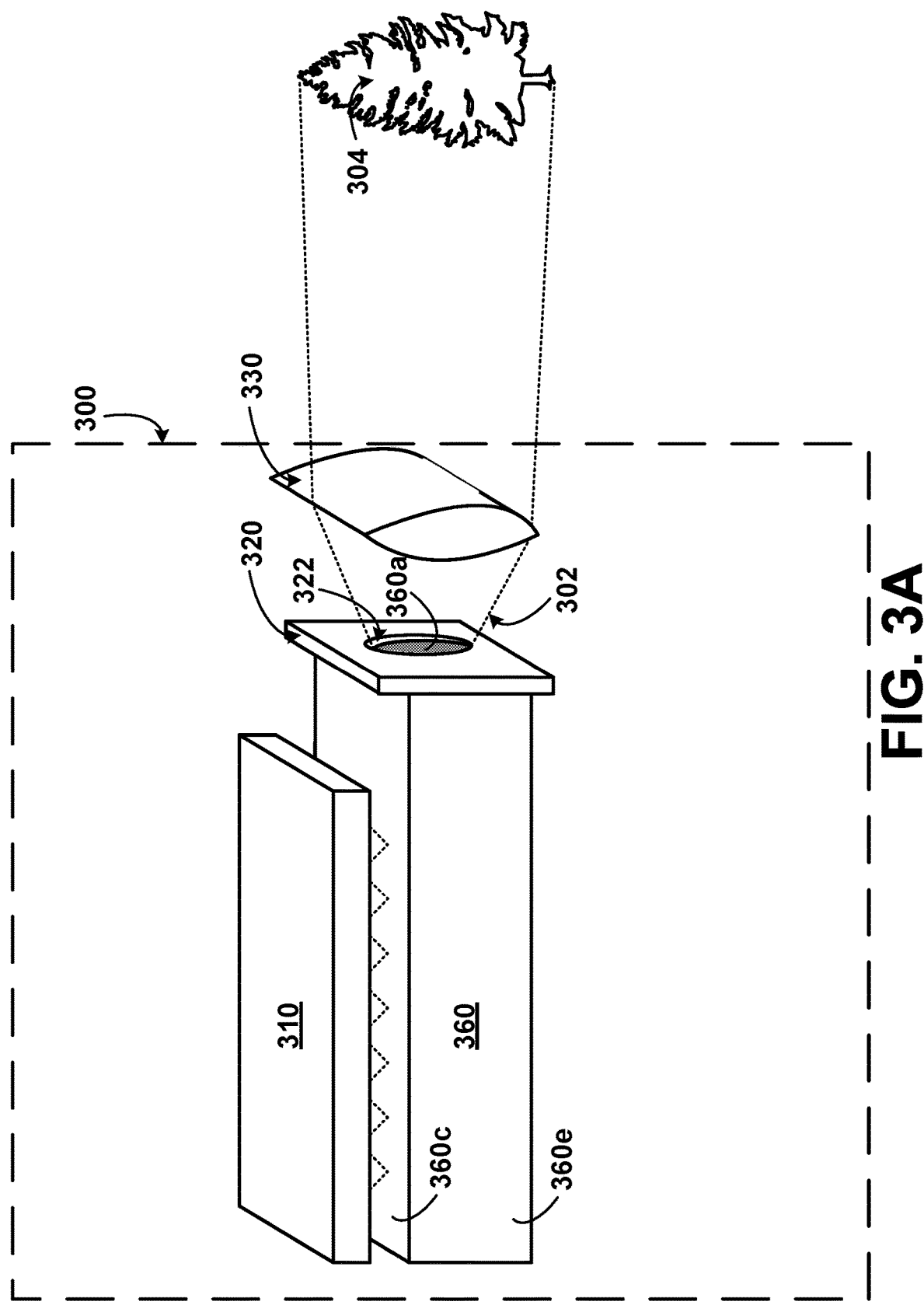
FIG. 3A is an illustration of a noise limiting system that includes an aperture and a waveguide, according to example embodiments.
Figure 3B:
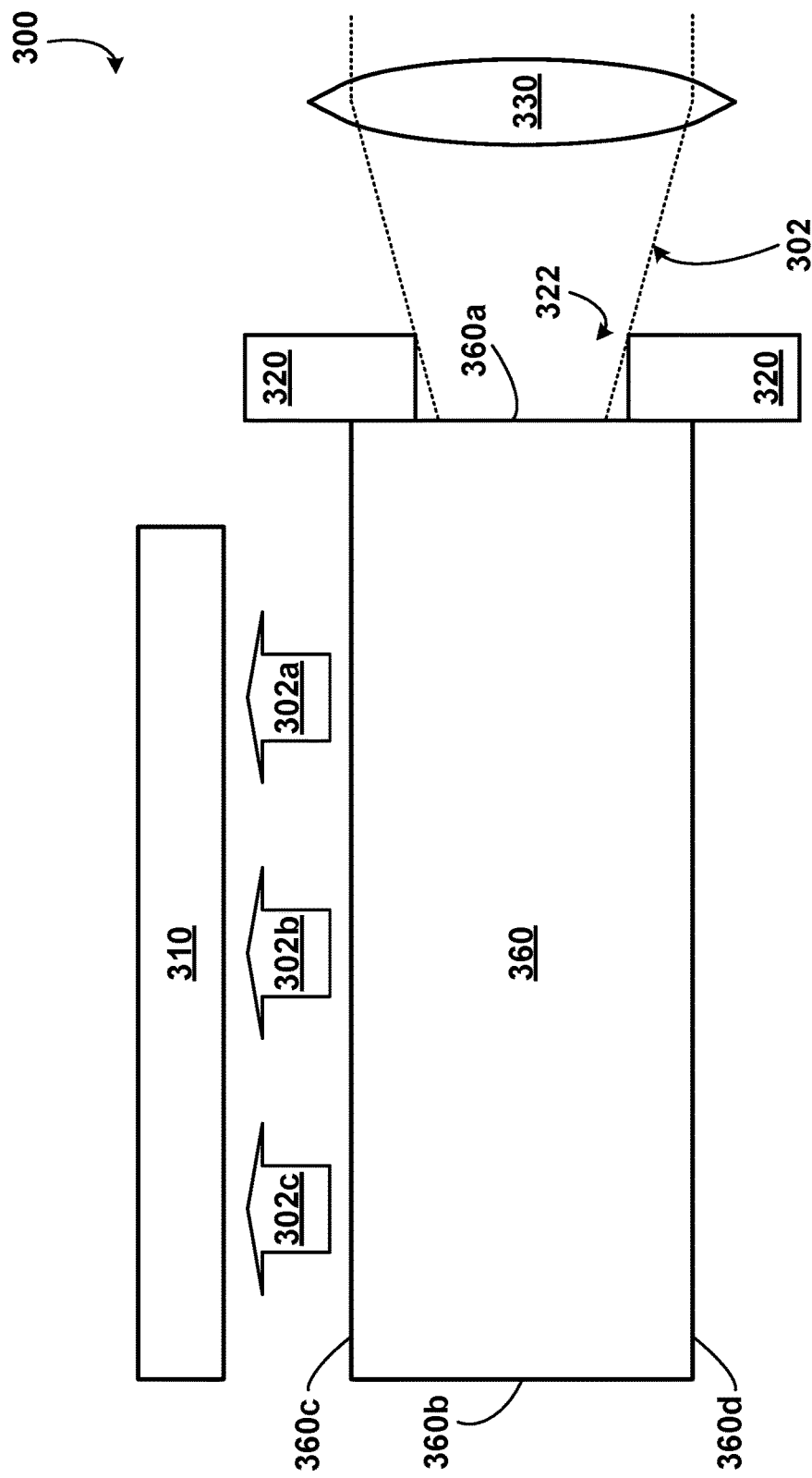
FIG. 3B illustrates a cross-section view of the system of FIG. 3A.

FIG. 3A is an illustration of a noise limiting system 300 that includes an aperture and a waveguide, according to example embodiments. FIG. 3B illustrates a cross-section view of system 300, according to example embodiments. In some implementations, system 300 can be used with device 200 instead of or in addition to system 290. As shown, system 300 may measure light 302 scattered by an object 304 within a scene similarly to, respectively, system 100, light 102, and object 104. Further, as shown, system 300 includes a light detector array 310, an opaque material 320, an aperture 322, and a lens 330 which may be similar, respectively, to array 110, material 120, aperture 122, and lens 130. For the sake of example, aperture 322 is shown to have a different shape (elliptical) compared to a shape of aperture 122 (rectangular). As shown, system 300 also includes a waveguide 360 (e.g., optical waveguide, etc.) arranged to receive light 302 (or a portion thereof) transmitted through aperture 322 and projected onto (e.g., shaded region) a receiving side 360a of waveguide 360.

Waveguide 360 can be formed from a glass substrate (e.g., glass plate, etc.) or any other material at least partially transparent to one or more wavelengths of light 302. In some examples, as shown, waveguide 360 may be proximally positioned and/or in contact with opaque material 320 such that light 302 transmitted through aperture 322 is projected onto receiving side 360a (e.g., input end) of waveguide 360. Waveguide 360 may then guide at least a portion of received light 302, via total internal reflection or frustrated total internal reflection (FTIR) for instance, inside waveguide 360 toward another end of waveguide 360. For example, where waveguide 360 is a rectangular waveguide as shown, waveguide 360 can guide received light 302 toward side 360b opposite to side 360a.

As shown, for instance, waveguide 360 may extend vertically between sides 360c and 360d. To that end, sides 360c and 360d may correspond to interfaces between a relatively high index of refraction medium (e.g., glass, etc.) of waveguide 360 and a relatively lower index of refraction medium (e.g., air, vacuum, etc.) adjacent to sides 360c and 360d. Thus, for instance, if guided light 302 propagates to side 360c at less than the critical angle (e.g., which may be based on a ratio of indexes of refractions adjacent to side 360c, etc.), then the guided light incident on side 360c (or a portion thereof) may be reflected back into waveguide 360. Similarly, as shown, waveguide 360 may extend horizontally between side 360e and another side of waveguide 360 (not shown) opposite to side 360e to reduce divergence of the guided light horizontally, for example.

Further, as shown, light portions 302a, 302b, 302c of light 302 may propagate out of side 360c extending along a guiding direction of waveguide 360 (e.g., between sides 360a and 360b). In one example, guided light portions 302a, 302b, 302c may correspond to an evanescent field of light evanescing through side 360c. In this example, evanescent light 302a, 302b, 302c may leak out of waveguide 360 for various reasons. For instance, light portions 302a, 302b, 302c may correspond to light arriving at side 360c at an angle greater than the critical angle. As a result, guided light portions 302a, 302b, 302c may thus escape waveguide 360 rather than reflect (e.g., via total internal reflection) back into waveguide 360. In another example, waveguide 360 may comprise deformations (e.g., dents, etc.) along a surface of side 360c that allow light portions 302a, 302b, 302c to propagate out of waveguide 360, while causing a remaining portion of guided light 302 to continue propagating toward side 360b.

Thus, unlike light detector array 110, light detector array 310 can be positioned (as shown) along the guiding direction of waveguide 360 (e.g., adjacent to side 360c) to intercept and/or detect light portions 302a, 302b, 302c propagating out of side 360c. Through this process, system 300 may provide an increased detection area for intercepting light 302 while also efficiently utilizing the space behind opaque material 320.

It is noted that the sizes, positions, and shapes of the various components and features shown in FIGS. 3A and 3B are not necessarily to scale, but are illustrated as shown for convenience in description. Further, in some embodiments, system 300 may include fewer or more components than those shown. Further, in some embodiments, one or more of the components shown can be combined, or divided into separate components.

In a first embodiment, light detector array 310 can be alternatively disposed (e.g., molded, etc.) on side 360c.

In a second embodiment, a distance between waveguide 360 and aperture 322 can vary. In one example, as shown, waveguide 360 can be disposed along (e.g., in contact with, etc.) opaque material 320. Thus, for instance, side 360a (i.e., input end of waveguide 360) can be substantially coplanar with or proximal to aperture 322. With this arrangement for instance, waveguide 360 can receive and guide light 302 prior to divergence of light 302 transmitted through aperture 302. However, in other examples, waveguide 360 can be alternatively positioned at a distance (e.g., gap) from opaque material 320 (and aperture 322).

In a third embodiment, the arrangement of aperture 322 (and/or side 360a of waveguide 360) relative to lens 330 can vary.

In one example, aperture 322 (and/or an input end of waveguide 360) can be disposed along the focal plane of lens 330.

In another example, aperture 322 (and/or an input end of waveguide 360) can be disposed parallel to the focal plane of lens 330 but at a different distance to lens 330 than the distance between the focal plane and lens 330. Thus, in this example, optical characteristics (e.g., focus configuration, etc.) of system 300 can be adjusted depending on an application of system 300. As such, in some instances, focused light 302 may continue converging (after transmission through aperture 322) inside waveguide 360 before beginning to diverge toward side 360b. In some instances, system 300 may also include an actuator that moves lens 330, opaque material 320, and/or waveguide 360 to achieve a particular optical configuration while scanning the scene.

In yet another example, aperture 322 (and/or side 360a of waveguide 360) can be arranged at an offset orientation relative to the focal plane of lens 330. For instance, system 300 can rotate (e.g., via an actuator) opaque material 320 (and/or array 360) to adjust the entry angle of light 302 into waveguide 360. By doing so, a controller (e.g., controller 250) can further control optical characteristics of system 300 depending on various factors such as lens characteristics of lens 330, environment of system 300 (e.g., to reduce noise/interference arriving from a particular region of the scanned scene, etc.), among other factors.

In a fourth embodiment, material 320 can be omitted and side 360a can be alternatively positioned along or parallel to the focal plane of lens 330. In this embodiment, side 360a may thus correspond to an aperture.

In a fifth embodiment, the light detectors in array 310 can be alternatively implemented as separate physical structures coupled (e.g., disposed on or molded to, etc.) to waveguide 360.

In a sixth embodiment, light detector array 310 can be implemented to alternatively or additionally overlap other sides of waveguide 360 (e.g., side 360e, side 360d, etc.). Thus, in this embodiment, the light detectors in array 310 can detect light leaking out of waveguide 360 over an even greater detection area.

In a seventh embodiment, waveguide 360 can alternatively have a cylindrical shape, such as an optical fiber. In this embodiment, the light detectors in array 360 can be alternatively arranged to surround an outer surface of the optical fiber to detect light portions 302a, 302b, 302c, etc., evanescing or otherwise leaking out of the cylindrical outer surface of the optical fiber. Thus, in various embodiments, waveguide 360 can be implemented as a rigid structure (e.g., slab waveguide) or as a flexible structure (e.g., optical fiber).

In line with the discussion above, for example, waveguide 360 can be configured as a waveguide diffuser that diffuses light 302 (or a portion thereof) transmitted through aperture 322 into a detection area that can have various shapes or positions, as opposed to a flat surface (e.g., shaded region shown in FIG. 1A) orthogonal to a direction of propagation of diverging light 102.

Figure 4:
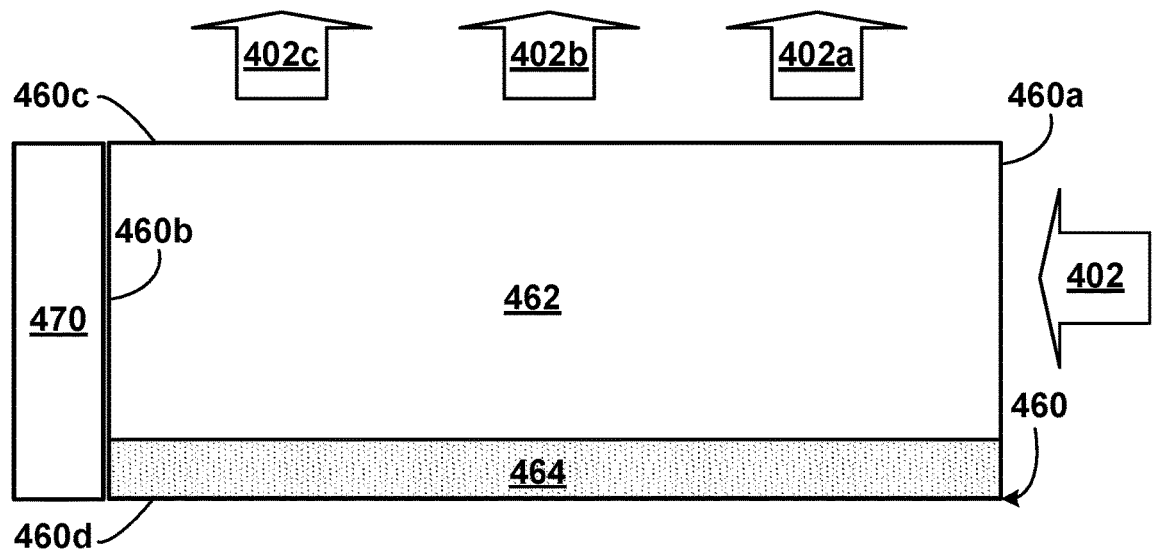
FIG. 4 illustrates a cross-section view of a waveguide coupled to a mirror, according to example embodiments.

FIG. 4 illustrates a waveguide 460 coupled to a mirror 470, according to example embodiments. Waveguide 460 may be similar to waveguide 360. Thus, for example, waveguide 460 can be used in system 300 instead of or in addition to waveguide 360. To that end, light 402, light portions 402a, 402b, 402c, and sides 460a, 460b, 460c, 460d may be similar, respectively, to light 302, light portions 302a, 302b, 302c, and sides 360a, 360b, 360c, 360d.

Mirror 470 may comprise any reflective material that reflects light propagating out of side 460b back into waveguide 460. As a result, for instance, light that did not diffuse through side 460c can be returned back into waveguide 460 to further increase the likelihood of diffusion toward light detectors (not shown) adjacent to side 460c.

As shown, waveguide 460 includes a core region 462 that is partially surrounded by a cladding layer 464. Core region 462 may comprise a relatively high index of refraction material, such as a glass substrate for instance, that is transparent to at least some wavelengths of light 302. Cladding layer 464 may comprise a relatively low index of refraction material, such as polymer coated or fluorine doped glass substrates for instance. In some examples, waveguide 360 can be formed from a glass substrate that includes doped regions corresponding to cladding layer 464. Thus, regions of the glass substrate that are not doped may correspond to core 462.

As shown, cladding layer 464 is disposed on side 460d but not on side 460c. With this arrangement, for instance, diffusing light portions 402a, 402b, 402c may be more likely to exit waveguide 460 through side 460c relative to side 460d. For example, the presence of cladding layer 464 may cause the critical angle for light incident on an interface between core 462 and cladding 464 to be greater than a corresponding critical angle at side 460c. As a result, a greater extent of guided light inside waveguide 460 may diffuse out of side 460c toward light detectors (not shown), such as the light detectors in array 310 of system 300 for example.

In some examples, cladding layer 464 can extend along other sides of waveguide 460 in addition to or instead of side 460d. Referring back to FIGS. 3A and 3B for example, a cladding layer may be configured to surround waveguide 360 along sides 360e and a side of waveguide 360 opposite to side 360e (not shown). With this arrangement, for instance, diffusion of light portions 402a, 402b, 402c through side 460c can be further improved relative to other sides that are surrounded by cladding 464.

To enhance diffusion of light portions 402a, 402b, 402c through side 460c, in some implementations, a texture of a surface of side 460c can additionally or alternatively have a greater roughness than other sides (e.g., side 460d) of waveguide 460. Thus, for example, waveguide 460 can be implemented as a rough waveguide having a pseudorandom rough surface 460c. Alternatively or additionally, in some examples, the surface of side 460c can have scattering features (e.g., dents, indentations, etc.) positioned in predefined locations that overlap with light detectors (not shown). In these examples, the scattering features may increase the likelihood of diffusion of light portions 402a, 402b, 402c, at particular locations where corresponding light detectors are positioned.

In some implementations, it may be desirable to include a cladding layer at side 460c as well. For example, as a length of waveguide 460 between sides 460a and 460b increases, more of guided light 402 may exit from a region of side 460c closer to side 460a than a region of side 460c closer to side 460b.

Figure 5:
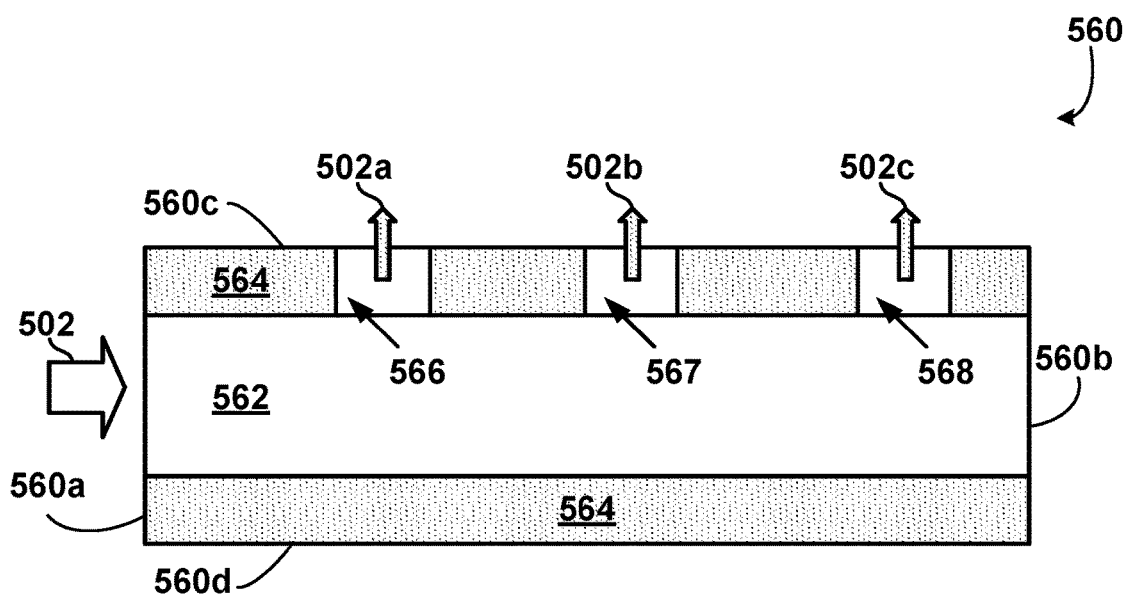
FIG. 5 illustrates a cross-section view of a waveguide that includes a cladding layer having a plurality of deformations, according to example embodiments.

Accordingly, FIG. 5 illustrates a cross-section view of a waveguide 560 that includes a cladding layer 564 having a plurality of deformations 566, 567, 568, according to example embodiments. Waveguide 560 may be similar to waveguide 360. Thus, for example, waveguide 560 can be used in system 300 instead of or in addition to waveguide 360. To that end, diverging light 502, light portions 502a, 502b, 502c, and sides 560a, 560b, 560c, 560d may be similar, respectively, to diverging light 302, light portions 302a, 302b, 302c, and sides 360a, 360b, 360c, 360d. Further, waveguide 560 includes a core 562 and a cladding layer 564 that may be similar, respectively, to core 452 and cladding layer 464.

As shown, unlike waveguide 460, cladding layer 564 extends over side 560c from which light portions 502a, 502b, 502c diffuse out of waveguide 560. Various configurations are possible for deformations 566, 567, 568. In one example, deformations 566, 567, 568 may correspond to removed, thinned, and/or otherwise distorted portions of cladding layer 564. To that end, deformations 566, 567, 568 may be formed using various techniques such as mechanical friction (e.g., sandpaper, etc.), machining, etching, etc. In another example, deformations 566, 567, 568 may correspond to materials having a same or higher index of refraction as core 562. For example, deformations 566, 567, 568 may include a same polymer as core region 562 or another polymer having a similar (or higher) index of refraction. In yet another example, the deformations 566, 567, 568 may correspond to regions of cladding layer 564 having a smaller thickness than other areas of the cladding layer 564.

Regardless of the implementation, light portions 502a, 502b, 502c may exit waveguide 560 via, respectively, deformations 566, 567, 568 due to the higher index of refraction in these regions. In turn, for example, light detectors (not shown) can be aligned with deformations 566, 567, 568 to detect diffusing light portions 502a, 502b, 502c. For instance, each light detector can be disposed in contact with or proximate to a deformation. Further, for example, the presence of cladding layer 564 between deformations 566, 567, 568 may cause more of the guided light inside waveguide 560 to continue propagating toward side 560b.

In an alternative implementation, although not shown, deformations 566, 567, 568 can be alternatively implemented as regions of cladding layer 564 that have a smaller thickness compared to other regions that are not aligned with a light detector. In yet another alternative implementation, although not shown, the thickness of core 562 can be alternatively reduced in regions that overlap respective light detectors. Regardless of the implementation, frustrated total internal reflection (FTIR) may occur at the locations of deformations 566, 567, 568 due to the index of refraction distortions at these locations.

As a result of the deformations and the cladding layer in waveguide 560, guided light 502 can diffuse over a relatively larger surface area of side 560c compared to a surface area of side 460c of waveguide 460 from which guided light 402 diffuses.

Figure 6:
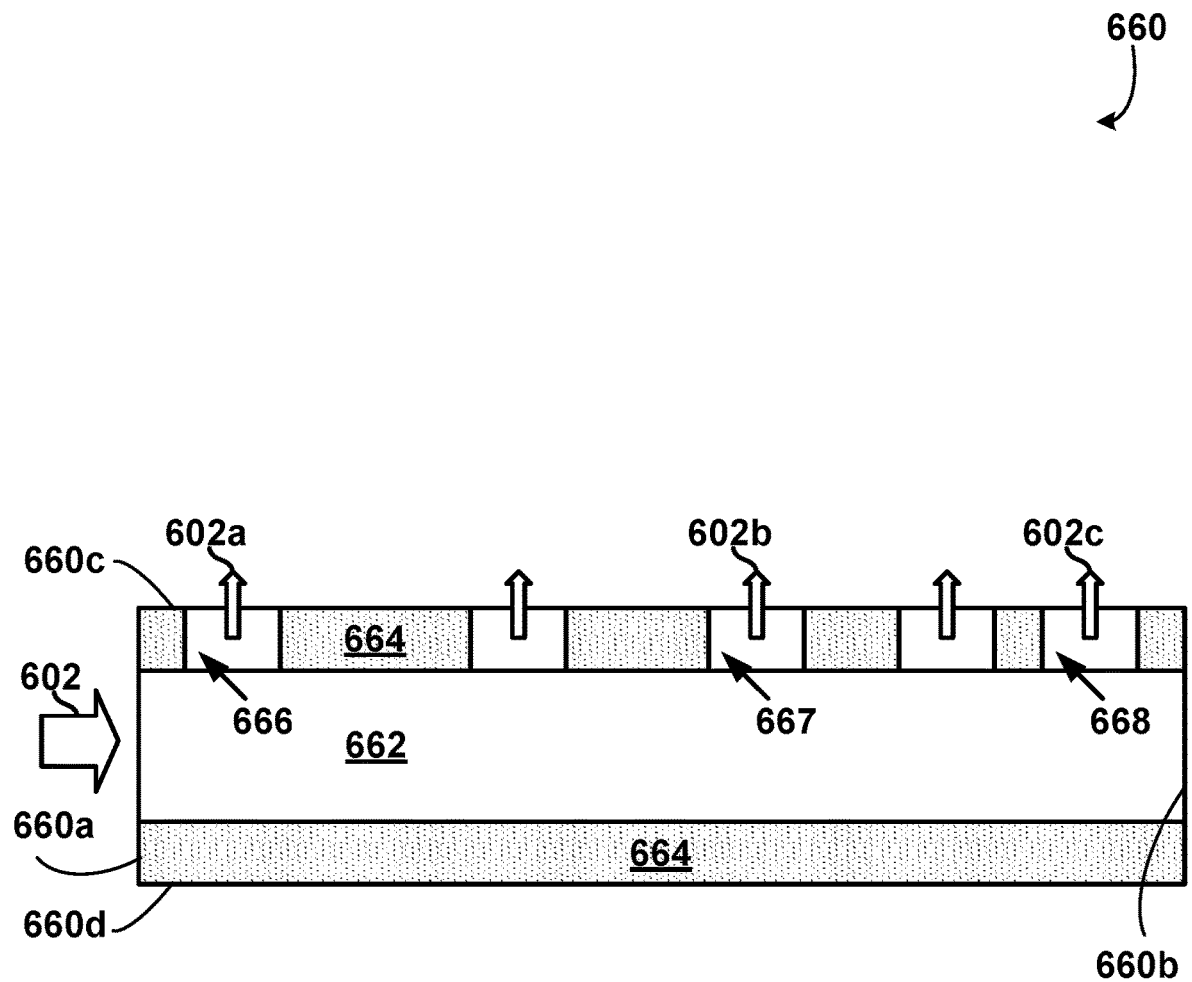
FIG. 6 illustrates a cross-section view of a waveguide that includes a cladding layer having variably spaced deformations, according to example embodiments.

FIG. 6 illustrates a waveguide 660 that includes a cladding layer 664 having a plurality of variably spaced deformations, exemplified by deformations 666, 667, 668, according to example embodiments. Waveguide 660 may be similar to waveguide 560. Thus, for example, waveguide 660 can be used in system 300 instead of or in addition to waveguide 360. To that end, diverging light 602, light portions 602a, 602b, 602c, sides 660a, 660b, 660c, 660d, core 662, cladding 664, and deformations 666, 667, 668 may be similar, respectively, to diverging light 502, light portions 502a, 502b, 502c, sides 560a, 560b, 560c, 560d, core 562, and cladding 564.

However, unlike deformations 566, 567, 568 of waveguide 560, deformations 666, 667, 668 may be variably spaced along cladding layer 664. By doing so, for instance, waveguide 660 can enhance uniformity of light portions 602a, 602b, 602c propagating out of deformations 666, 667, 668, and/or increase a region of side 660c (e.g., lengthwise between sides 660a and 660b) through which the guided light continues to diffuse out of waveguide 660.

In an example scenario, light portion 602c propagating out of deformation 668 may have a lower amount, intensity, brightness, etc., than light portion 602a propagating out of deformation 666. Such discrepancy may be caused by various factors. For example, an amount of light 602a propagating out of deformation 666 may be greater due to deformation 666 being closer to side 660a. As guided light 602 propagates toward side 660b, for instance, less of the guided light may remain for diffusion through deformation 668 due to diffusion of portions of guided light 602 via successive deformations in waveguide 660. Accordingly, in some examples, deformations 666, 667, 668, etc., can be variably spaced to provide a more uniform intensity of diffused light portions 602a, 602b, 602c. For example, as shown in FIG. 6, a distance between deformations 667 and 668 may be smaller than a distance between deformations 666 and 667. The diffused light portions 602a, 602b, 602c could be intercepted by light detectors (not shown), such as the light detectors in array 310.

Additionally, in some examples, the distance between adjacent deformations may be based on a given distance from the adjacent deformations to side 660a. For example, the distance between adjacent deformations in waveguide 660 could be gradually reduced depending on how far the deformations are from side 660a.

Alternatively or additionally, the distances between adjacent deformations in waveguide 660 can be selected according to an expected wavelength of light 602. For example, where light 602 comprises light pulses emitted by a LIDAR laser emitter (e.g., emitter 240), the spacing between deformations 666, 667, 668, etc., can be selected such that waveguide 660 is configured as a grating coupler that selects particular wavelengths for diffusion via the deformations toward respective light detectors. To facilitate this, in some implementations, the thickness of cladding 664 can also be predefined to enhance constructive interference of the light having the selected wavelength(s). Additionally, although not shown, a mirror (similar to mirror 470) can be arranged adjacent to side 660d to reflect evanescing light escaping through cladding 664 back into waveguide 660, thereby further improving constructive interference.

Referring back to FIG. 2, in some scenarios, it may be desirable to obtain additional information from multiple apertures (or a large aperture) simultaneously with the information obtained using the current aperture configuration, while still achieving a target SNR. By way of example, a light pulse emitted by emitter 240 could be scattered off several objects at different distances to LIDAR device 200, and a portion of the scattered light may thus be focused, via lens 230, onto a region of opaque material 220 outside the current aperture. Therefore, referring back to FIG. 1A for instance, it may be desirable to detect light focused onto a region adjacent to aperture 122 while simultaneously detecting light focused onto aperture 122. However, if an additional aperture is positioned adjacent to aperture 122 (or the size of aperture 122 is increased), the diverging light from the additional aperture may overlap with diverging light 102 prior to arrival at array 110, thereby reducing the SNR of the detected signal.

Figure 7:
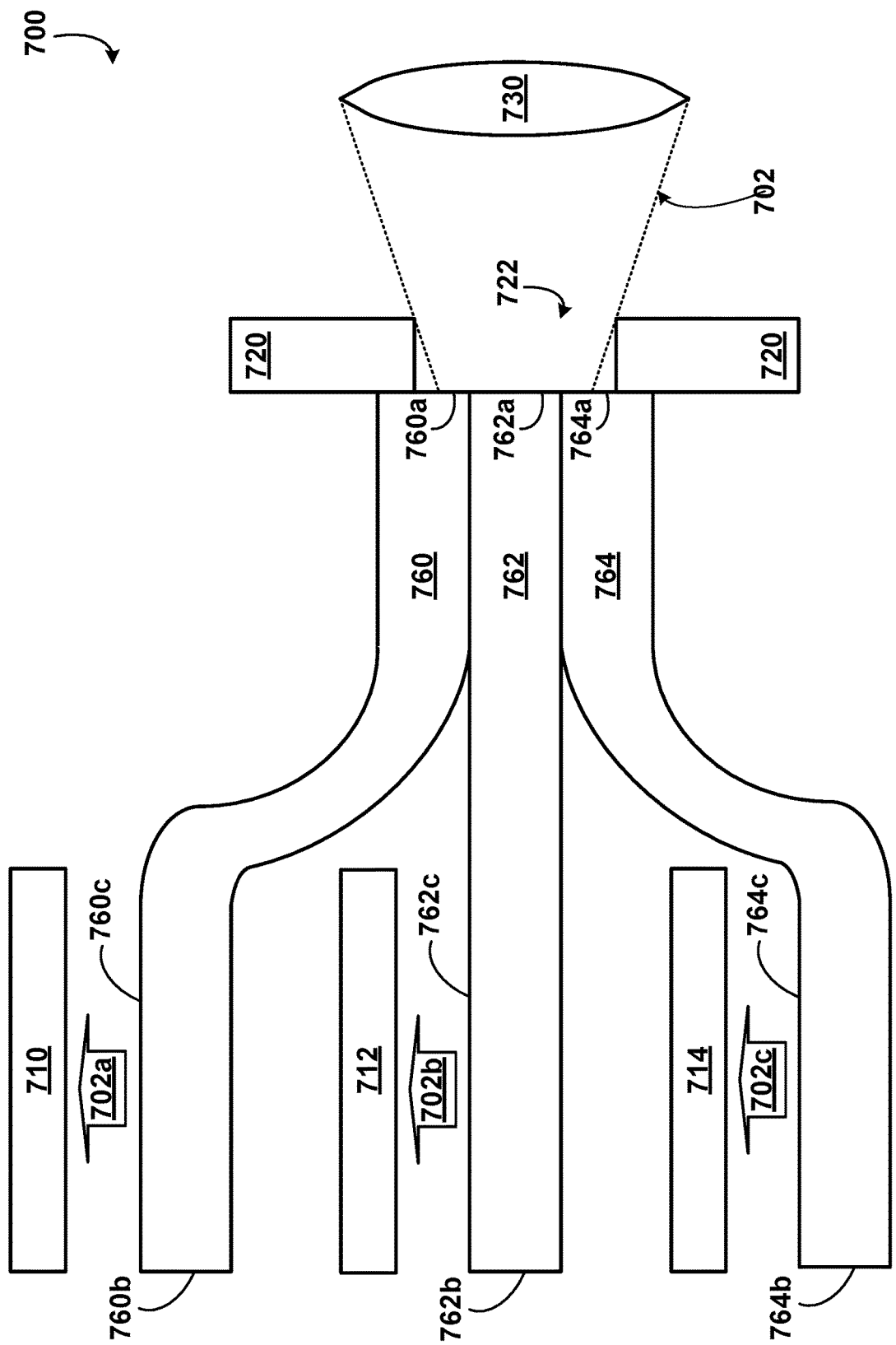
FIG. 7 is an illustration of a noise limiting system that includes an aperture and multiple waveguides, according to example embodiments.

FIG. 7 is an illustration of a noise limiting system 700 that includes an aperture and multiple waveguides, according to example embodiments. System 700 may be similar to system 300, for example. To that end, a lens 730 may focus light 702 into an aperture 722 defined within opaque material 720 similarly to, respectively, lens 330, light 302, aperture 322, and opaque material 320. Thus, light 702 may be transmitted through aperture 722. Further, system 700 includes light detector arrays 710, 712, and 714 that are each similar to array 310. For example, array 710 may include a plurality of light detectors (not shown) that are connected in parallel to one another (e.g., parallel circuit configuration) to provide a combined output indicative of light portion 702a incident on array 710. Similarly, for example, array 712 may include another plurality of connected light detectors that intercept light portion 702b, and array 714 may include yet another plurality of connected light detectors that intercept light 702c.

Unlike system 300 however, as shown, system 700 includes multiple waveguides 760, 762, 764 arranged behind opaque material 720 to receive the respective portions of diverging light 702. Thus, for example, waveguide 760 may receive a first portion of light 702 at side 760a and guide the received portion toward an opposite side 760b of waveguide 760. Some of the guided light can be diffused through side 760c (extending between sides 760a and 760b along a guiding direction of waveguide 760) as light 702a that can then be intercepted and detected by light detectors in array 710. Similarly, for example, waveguide 762 can receive a second portion of light 702 at side 762a and guide the second portion toward an opposite side 762b of waveguide 762. Some of the guided light can thus be diffused through side 762c as light 702b that can be intercepted and detected by light detectors in array 712. Similarly, for example, waveguide 764 can receive a third portion of light 702 at side 764a and guide the third portion toward an opposite side 764b of waveguide 764. Some of the guided light can thus be diffused through side 764c as light 702c that can be intercepted and detected by light detectors in array 714.

Thus, with this arrangement, system 700 can allow detection of light propagating through smaller adjacent apertures (i.e., corresponding to portions of aperture 722) simultaneously over relatively larger detection areas, while preventing overlap between the light from the respective adjacent apertures. To facilitate this, as shown, each pair of adjacent waveguides may extend away from one another along the respective guiding directions of receiving waveguides. For example, as shown, waveguide 760 extends away from waveguide 762 and waveguide 764 extends away from waveguide 762.

Although input ends 760a, 762a, 764a of waveguides 760, 762, 764 are shown to have a similar size, in some examples, input ends 760a, 762a, 764a may have different sizes relative to one another. By way of example, input end 762a of waveguide 762 may have a greater size than input end 760a of waveguide 760. In this example, due to the difference between the cross-sectional areas of respective portions of light 702 incident on respective waveguides 760 and 762, light 702b detected at array 712 may represent a larger angular field-of-view (FOV) of the scanned scene relative to an angular FOV indicated by light 702a and incident on light detector 710.

In some examples, to prevent cross-talk between the waveguides, each waveguide may be configured to begin diffusing light onto a respective light detector array at a location where adjacent waveguides are sufficiently separated. For example, waveguide 760 may comprise cladding (e.g., cladding 464), and the cladding may not include any deformations until waveguide 760 bends away (e.g., based on a curvature of curved side 760c) from waveguide 762 to provide a sufficient separation distance to reduce or prevent leakage of guided light between waveguides 760 and 762.

In some examples, system 700 may also include absorber layer(s) (e.g., carbon black, black chrome, etc.) positioned (not shown) between the various waveguides to further prevent potential cross-talk between the adjacent waveguides. For example, an absorber layer may absorb evanescing light or other light propagating between the adjacent waveguides (e.g., cladding modes of light propagating inside a waveguide cladding).

Thus, system 700 may allow for multi-pixel imaging of the scene indicated by diverging light 702 transmitted through aperture 722, while also reducing background noise since only a small respective portion of the light (and its associated background noise) are guided by each waveguide. For example, as shown, combined outputs from light detectors in array 710 may correspond to a first pixel that indicates light transmitted through a first lengthwise portion of aperture 722, combined outputs from light detectors in array 712 may correspond to a second pixel that indicates light transmitted through a second lengthwise portion of aperture 722, and combined outputs from light detectors in array 714 may correspond to a third pixel that indicates light transmitted through a third lengthwise portion of aperture 722. As such, for example, controller 250 of device 200 can compute a one-dimensional (1D) image (e.g., vertically in a lengthwise direction of aperture 722) of the scene by combining the three pixels.

However, it is noted that system 700 can alternatively include more or fewer waveguides to generate a 1D image with more or fewer pixels. Further, although waveguides 760, 762, 764 are shown in a lengthwise (e.g., vertical) arrangement relative to aperture 722, in some examples, system 700 may include waveguides in a different arrangement. In one example, the receiving sides (e.g., 760a, 762a, 764a) of the waveguides can alternatively be arranged horizontally (e.g., along a direction perpendicular to the page) to obtain a horizontal 1D image of the scene. In another example, the receiving sides of the waveguides can alternatively be arranged both horizontally and vertically (e.g., as a two-dimensional grid) adjacent to aperture 722. Thus, in this example, controller 250 can combine outputs from the waveguides to generate a two-dimensional (2D) image of the scene.

III. Example Methods and Computer Readable Media

Figure 8:
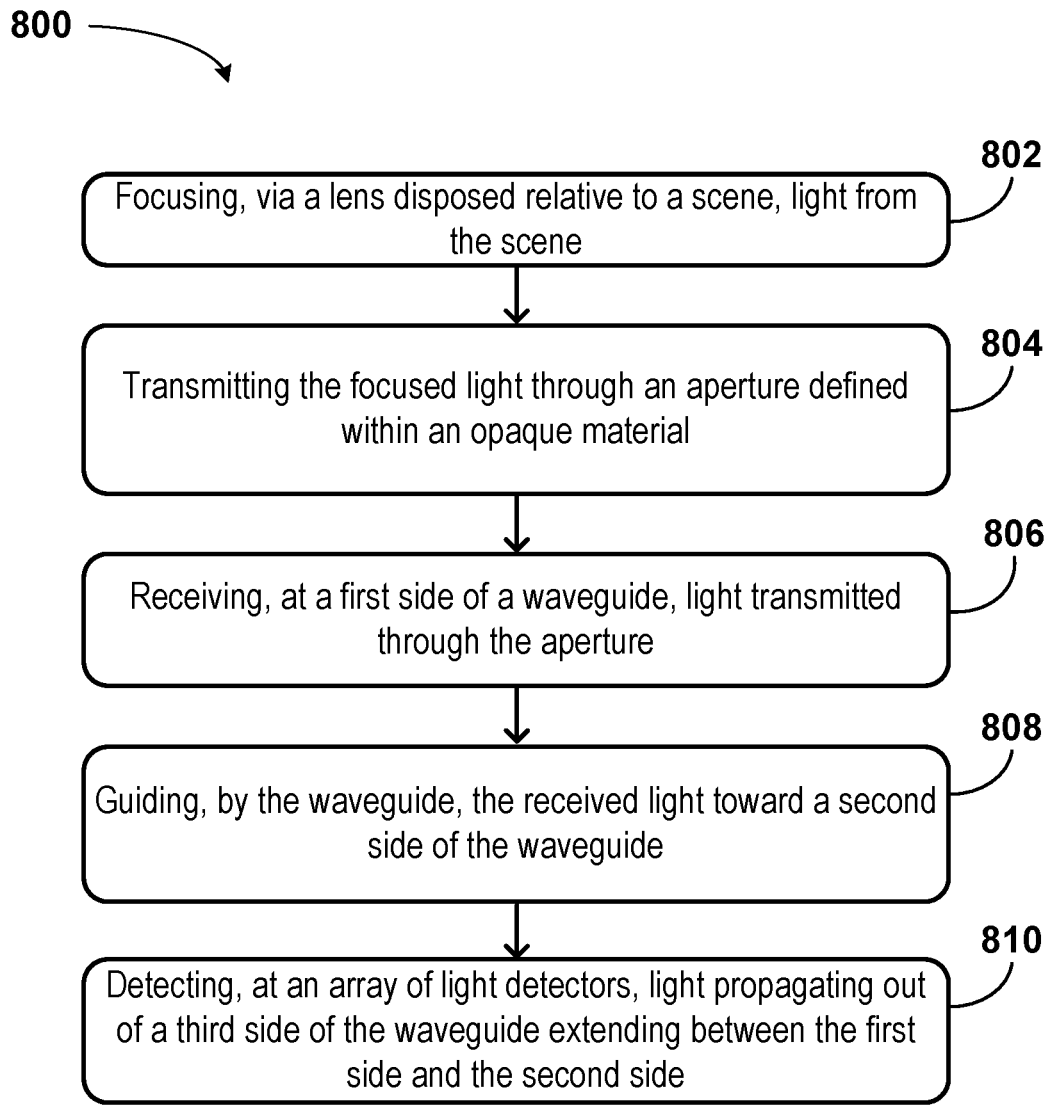
FIG. 8 is a flowchart of a method, according to example embodiments.

FIG. 8 is a flowchart of a method 800, according to example embodiments. Method 800 presents an embodiment of a method that could be used with any of systems 100, 300, 700, device 200, and/or waveguides 460, 560, and 660, for example. Method 800 may include one or more operations, functions, or actions as illustrated by one or more of blocks 802-810. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 800 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 800 and other processes and methods disclosed herein, each block in FIG. 8 may represent circuitry that is wired to perform the specific logical functions in the process.

At block 802, method 800 involves focusing, by a lens (e.g., lens 130) disposed relative to a scene, light from the scene. In some examples, the light from the scene may be scattered by an object (e.g., object 104) within the scene. In some examples, a computing device (e.g., controller 250) may actuate or otherwise adjust a characteristic of the lens (e.g., focal plane, focal length, etc.). At block 804, method 800 involves transmitting the focused light through an aperture (e.g., aperture 322) defined within an opaque material (e.g., opaque material 120). At block 806, method 800 involves receiving, at a first side (e.g., side 360a) of a waveguide, at least a portion of the light transmitted through the aperture. At block 808, method 800 involves guiding, by the waveguide, the received light toward a second side of the waveguide (e.g., side 360b). At block 810, method 800 involves detecting light propagating out of a third side (e.g., side 360c, etc.) extending between the first side and the second side.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A system comprising:
   a lens;
   a waveguide;
   a mirror coupled to the waveguide;
   an aperture defined within an opaque material, wherein the aperture is disposed between the lens and the waveguide, wherein the lens is configured to focus light from a scene into the aperture such that diverging light is transmitted out of the aperture, and wherein at least a portion of the diverging light transmitted out of the aperture is projected onto the waveguide; and
   an array of light detectors that intercepts and detects at least a portion of the diverging light.

2. The system of claim 1, wherein the waveguide is disposed along the opaque material.

3. The system of claim 1, wherein the waveguide is positioned at a distance from the opaque material.

4. The system of claim 3, wherein the distance provides a gap between the waveguide and the aperture.

5. The system of claim 1, wherein the aperture is positioned at a focal plane of the lens.

6. The system of claim 1, wherein the waveguide is configured to guide light from a first side to a second side by total internal reflection or frustrated total internal reflection such that at least a portion of the guided light propagates out of the waveguide between the first side and the second side.

7. The system of claim 6, wherein the mirror is coupled to the waveguide between the first side and the second side.

8. The system of claim 1, wherein the array of light detectors comprises a plurality of single photon avalanche diodes (SPADs).

9. The system of claim 1, wherein the light detectors in the array are connected in parallel with one another.

10. The system of claim 1, wherein the array of light detectors comprises a silicon photomultiplier (SiPM).

11. A light detection and ranging (LIDAR) device, comprising:
a LIDAR transmitter that illuminates a scene; and
a LIDAR receiver that receives light scattered by one or more objects within the scene, wherein the LIDAR receiver comprises:
a lens;
a waveguide;
a mirror coupled to the waveguide;
an aperture defined within an opaque material, wherein the aperture is disposed between the lens and the waveguide, wherein the lens is configured to focus light from a scene into the aperture such that diverging light is transmitted out of the aperture, and wherein at least a portion of the diverging light transmitted out of the aperture is projected onto the waveguide; and
an array of light detectors that intercepts and detects at least a portion of the diverging light.

12. The LIDAR device of claim 11, wherein the waveguide is disposed along the opaque material.

13. The LIDAR device of claim 11, wherein the waveguide is positioned at a distance from the opaque material.

14. The LIDAR device of claim 13, wherein the distance provides a gap between the waveguide and the aperture.

15. The LIDAR device of claim 1, wherein the aperture is positioned at a focal plane of the lens.

16. The LIDAR device of claim 11, wherein the waveguide is configured to guide light from a first side to a second side by total internal reflection or frustrated total internal reflection such that at least a portion of the guided light propagates out of the waveguide between the first side and the second side.

17. The LIDAR device of claim 16, wherein the mirror is coupled to the waveguide between the first side and the second side.

18. The LIDAR device of claim 11, wherein the array of light detectors comprises a plurality of single photon avalanche diodes (SPADs).

19. The LIDAR device of claim 11, wherein the light detectors in the array are connected in parallel with one another.

20. The LIDAR device of claim 11, wherein the array of light detectors comprises a silicon photomultiplier (SiPM).

* * * * *